A. CASEY.
PROCESS OF MAKING HOLLOW BALLS OF CAST METAL.
APPLICATION FILED MAR. 2, 1907. RENEWED OCT. 22, 1908.

935,741.

Patented Oct. 5, 1909.
2 SHEETS—SHEET 1.

A. CASEY.
PROCESS OF MAKING HOLLOW BALLS OF CAST METAL.
APPLICATION FILED MAR. 2, 1907. RENEWED OCT. 22, 1908.
935,741.
Patented Oct. 5, 1909.
2 SHEETS—SHEET 2.
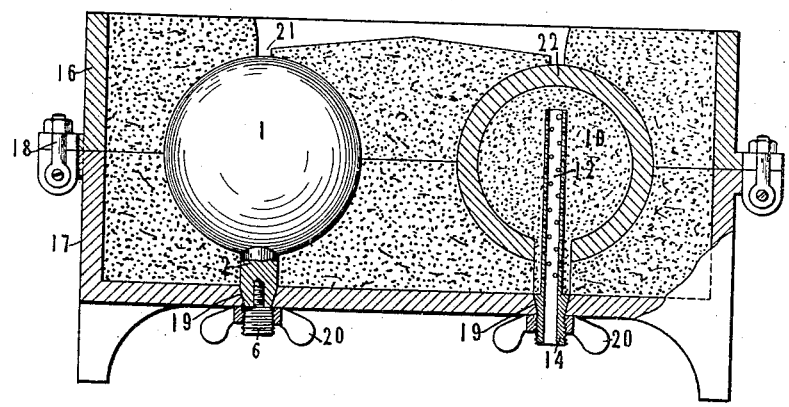
Fig. 3.
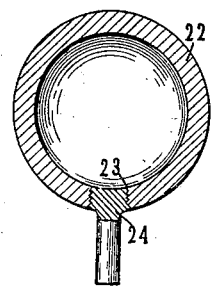   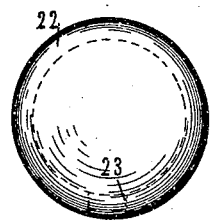
Fig. 4.   Fig. 5.

UNITED STATES PATENT OFFICE.

AMBROSE CASEY, OF SENECA FALLS, NEW YORK, ASSIGNOR TO THE GOULDS MANUFACTURING COMPANY, OF SENECA FALLS, NEW YORK, A CORPORATION OF NEW YORK.

PROCESS OF MAKING HOLLOW BALLS OF CAST METAL.

935,741.  Specification of Letters Patent.  Patented Oct. 5, 1909.

Application filed March 2, 1907, Serial No. 360,139. Renewed October 22, 1908. Serial No. 459,070.

*To all whom it may concern:*

Be it known that I, AMBROSE CASEY, of Seneca Falls, in the county of Seneca, in the State of New York, have invented new and useful Improvements in the Process of Making Hollow Balls of Cast Metal, of which the following, taken in connection with the accompanying drawings, is a full, clear, and exact description.

My invention relates to an improved method in manufacturing hollow metal articles, and more particularly to the manufacturing of hollow metal shells of spherical form having a uniform thickness throughout.

The invention accordingly consists in the several steps and the relation and order of each of the same to one or more of the others thereof which will be exemplified in the art hereinafter described, and the scope of the application of which will be indicated in the following claims.

Figure 1:
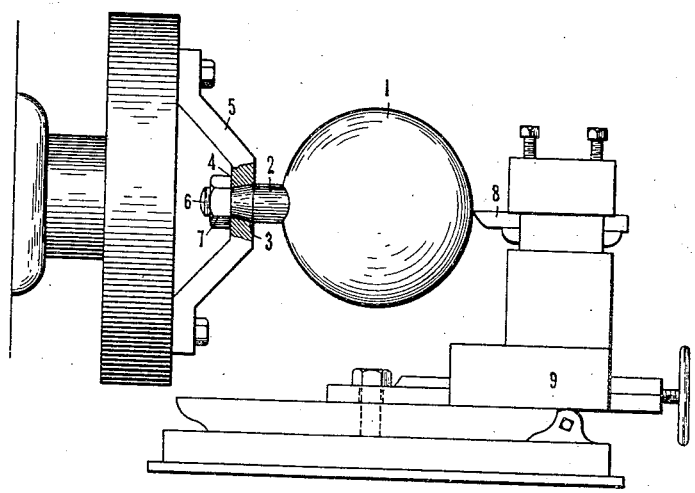
Figure 2:
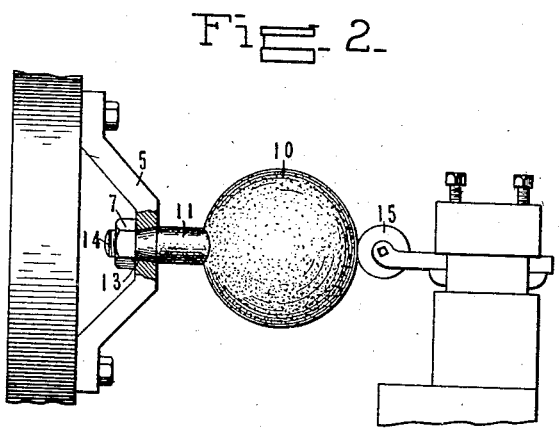

In the accompanying drawings, wherein is shown one method of carrying on this art, Figure 1 is a side elevation of a portion of a lathe or other turning device illustrating the method of forming the pattern. Fig. 2 is a similar view of Fig. 1, illustrating the method of forming the core. Fig. 3 is a sectional view of a flash showing two sand molds, one containing the pattern and the other containing the cast shell and core, parts being shown in section for the sake of clearness. Fig. 4 is a sectional view of the hollow shell showing the method of filling the opening therein; and Fig. 5 is a view in elevation of the finished article.

The process briefly described consists in first making a pattern of the desired form and providing it with means whereby it may be supported in a definite position within the molding flask or box, and then forming a core of the required form and dimension and providing said core with means whereby it may be supported within the molding flask with its center in exact coincidence with the center of the mold previously formed by the pattern.

For the purpose of illustration I have shown and described the process of constructing a spherical shell.

Referring to the drawings, I first construct a spherical pattern 1 of wood or any other suitable material and provide it with a stem 2 having a tapering end portion 3 which is adapted to fit snugly within a corresponding tapering socket 4 formed in the face plate 5 of the lathe. The stem is further provided with a threaded extension 6 adapted to receive a nut 7 whereby the pattern may be firmly secured to said face plate, as shown in Fig. 1. When the pattern has been secured in the manner above described, it is turned or trued up to the desired dimensions by means of a suitable cutting tool 8 mounted upon a rotating carriage 9 operated in the usual manner. The form of this pattern is made of the same form as that desired for the finished article, having approximately the same dimensions as the outer dimensions of the required article in order that the article after it has been cast may be finished in the usual manner, although, of course, if desired, I may make the outer dimensions of the pattern to substantially coincide with the outer dimensions of the required article without departing from the spirit of my invention. I next form a destructible core 10 of sand or other suitable material having the general form of the interior of the article to be manufactured, but being slightly larger in its dimensions, said core being provided with a stem 11 and containing a centrally extending, perforated tube 12, the outer end of which is provided with a tapering portion 13 of the same shape and size as the tapering portion of the pattern. The stem of the core is also provided with a threaded extension 14 similar to the threaded extension 6 of the pattern and adapted to receive the nut 7 whereby the core may be held within the face plate of the lathe in the same manner as that in which the pattern is held. The core is then trued up to the exact dimensions and form of the interior of the article which is to be manufactured, and for this purpose I preferably use a grinding or abrading wheel 15 which may be substituted for the cutting tool 8 shown in Fig. 1. In truing up the core the grinding wheel is so adjusted with respect thereto that the center of the spherical portion of the core will be the same distance from the tapering portion 13 as the center of the spherical portion of the pattern is distant from its tapering portion 3. After these parts have been formed in the manner above described the pattern is supported in a sectional molding flask or box comprising upper and lower sections 16 and 17 detachably secured together by any suitable means 18, and the wall of said flask is provided with one or more tapering sockets 19 exactly corresponding in shape and size to the tapering socket 4 within the face plate of the lathe, in order to receive the tapering ends of the stems of the pattern and core. The pattern is held securely in position by means of a thumb screw 20 or similar device engaging the threaded extension 6, the underside of the flask being preferably cut away or elevated as shown in Fig. 3 to permit access to said screw. Sand is then tamped or built up around the pattern in the usual manner thereby forming a mold or cavity of the same form and interior dimensions as the outer surface of the pattern, and a suitable gate or passage 21 is provided through which the molten metal may be poured in the usual manner. After the mold has been formed as described the sections of the flask are separated and the pattern removed after which the destructible core is placed within the flask with its tapering portion 13 snugly fitting within the tapering socket previously occupied by the tapering portion of the pattern, and owing to the fact that the center of the core is exactly the same distance from its tapering end as the center of the pattern is from its tapering end, it is evident that when the core is secured in position its center will be exactly coincident with the center of the spherical mold which has been formed by the pattern, thus leaving an intervening space of uniform thickness between the core and the wall of the mold. After the sand core is secured in position by means of the thumb screw 20 the sections of the flask are reassembled and molten metal is poured through the passage or gate until the intervening space between the core and the mold is completely filled.

When the casting 22 has cooled and hardened the parts of the flask are once more separated, the thumb screw is removed and the casting having the core contained therein is removed from the flask, after which the core is broken up in any suitable way and removed through the opening 23 in the shell which has been occupied by the stem of the core. I then fill this opening in the shell by inserting a metal plug 24 preferably of the same material as that of which the shell is composed and having a curvature corresponding to the curvature of the shell, which plug may be secured within the opening in any desired manner. As shown, I have formed a thread in the wall of the opening and the plug is correspondingly threaded whereby it may be securely held in position. The plug is preferably provided with a stem, extending centrally therefrom by means of which it may be held within the lathe, in case it is desired to true up or finish the outer surface of the shell, after which the stem may be cut off and the outer surface of the plug finished up in such a way as to leave an entirely smooth exterior.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention what I claim as new and desire to secure by Letters Patent is:

1. The herein disclosed process of casting hollow metallic articles, consisting in preliminarily forming from heat-enduring material and on a suitable stem a core slightly exceeding in size the interior dimensions of the article to be cast, then rotatably supporting said stem and turning up the surface of said rotating core to correspond with the predetermined interior dimensions of the article to be cast, obtaining a mold corresponding to the exterior of the hollow article to be cast and greater in size than said turned-up core, supporting said core in the predetermined position in said mold, and filling the space intervening between said core and mold with molten metal.

2. The herein-described process of forming hollow spherical articles which consists in forming a core of friable refractory material on the end of a suitable stem, mounting the protruding end of said stem in a rotating member and simultaneously presenting a finishing tool to the surface of said core and swinging said finishing tool about an axis extending through the predetermined center of said core, preparing a spherical mold, utilizing the protruding stem for supporting said finished spherical core accurately and concentrically within said spherical mold, filling the intervening space with molten metal, then breaking up and removing the core and stem from said hollow spherical casting, then inserting a supporting plug in the opening in said casting, utilizing said supporting plug to support said casting and then finishing the surface of the same, and finally cutting off the protruding portion of said supporting stem.

3. The herein-described method of forming hollow spherical articles, consisting of forming a one piece pattern corresponding to the form of the article desired, forming a mold by means of said pattern, forming a core on a stem, then supporting the protruding end of the stem and truing the surface of the core, supporting the stem in said flask so as to bring the center of the core coincident with the center of the mold formed by the pattern, filling the intervening space between the core and the mold with molten metal, removing the stem, and plugging the hole in the casting.

4. The herein-described method of making hollow spherical articles consisting in making a one piece pattern having the form of the article desired and provided with a tapering stem, forming a mold from said pattern by inserting its stem in a correspondingly tapering socket within the mold flask and drawing said stem to a tight fit, tamping sand about said pattern, removing said pattern from the mold, providing a spherical core having a tapering stem of the same size as the tapered stem of the pattern, inserting said tapering stem within said tapering socket and drawing the same to a tight fit, and filling the intervening space between the sand core and the mold with molten metal.

5. The herein-described method of forming hollow spherical articles consisting in forming a mold of substantially the form and dimensions of the exterior of the article required, providing a core having the form and dimensions of the interior of the article required, supporting said core symmetrically within said mold, filling the space between the mold and the core with molten metal, removing said core from the interior of the article, and finally filling the opening in the casting through which the stem of the core projected.

6. The herein-described method of forming hollow spherical articles consisting in forming a mold of substantially the form and dimensions of the exterior of the article required, providing a core having the form and dimensions of the interior of the article required, supporting said core symmetrically within the mold, filling the space between the mold and the core with molten metal, removing said core from the interior of the finished article, inserting a metal plug in the opening in the casting through which the core support projected, and finally finishing the exposed portion of the plug flush with the surface of the casting.

7. The herein-described method of forming hollow articles which consists in providing a pattern having the exact exterior form and dimensions of the required article, forming a sand mold by the pattern, providing a sand core having the exact exterior form and dimensions required for the interior of the hollow article, supporting the sand core in the sand mold with its center coincident therewith, pouring molten metal into the intervening space between the core and sand mold, and then truing up the cast material on the same center as that on which the core and the pattern were trued.

8. The herein-described method of forming hollow articles consisting in providing a pattern trued up to have the exact form and dimensions of the required metal shell, forming the sand mold by the use of said pattern vertically positioned in said flask, providing a sand core trued up to have the exact exterior form and dimensions required for the interior of the hollow article, positioning the core vertically in the sand mold with its center coincident therewith, pouring molten metal into the intervening space between the core and the said mold, and then removing the spherical metal body from the sand mold and truing it up on the same center on which the core and the pattern were trued.

In witness whereof I have hereunto set my hand this 8th day of February 1907.

AMBROSE CASEY.

Witnesses:
RICHARD J. McCAUL,
HENRY CASEY.